Patented May 16, 1950

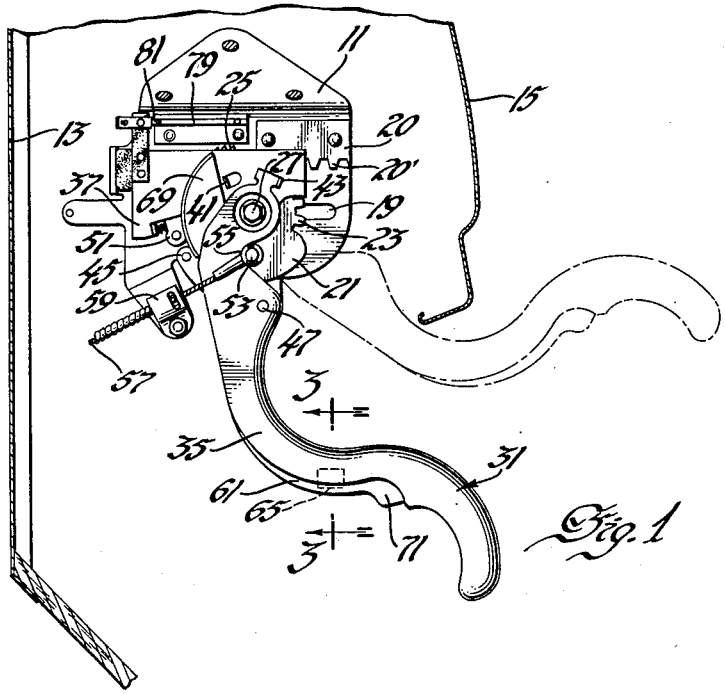
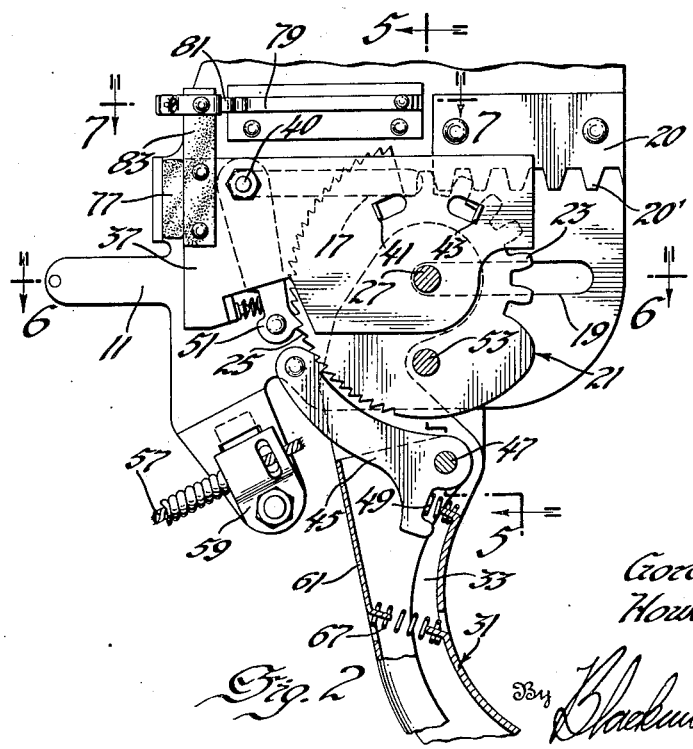
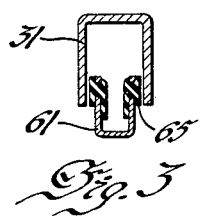

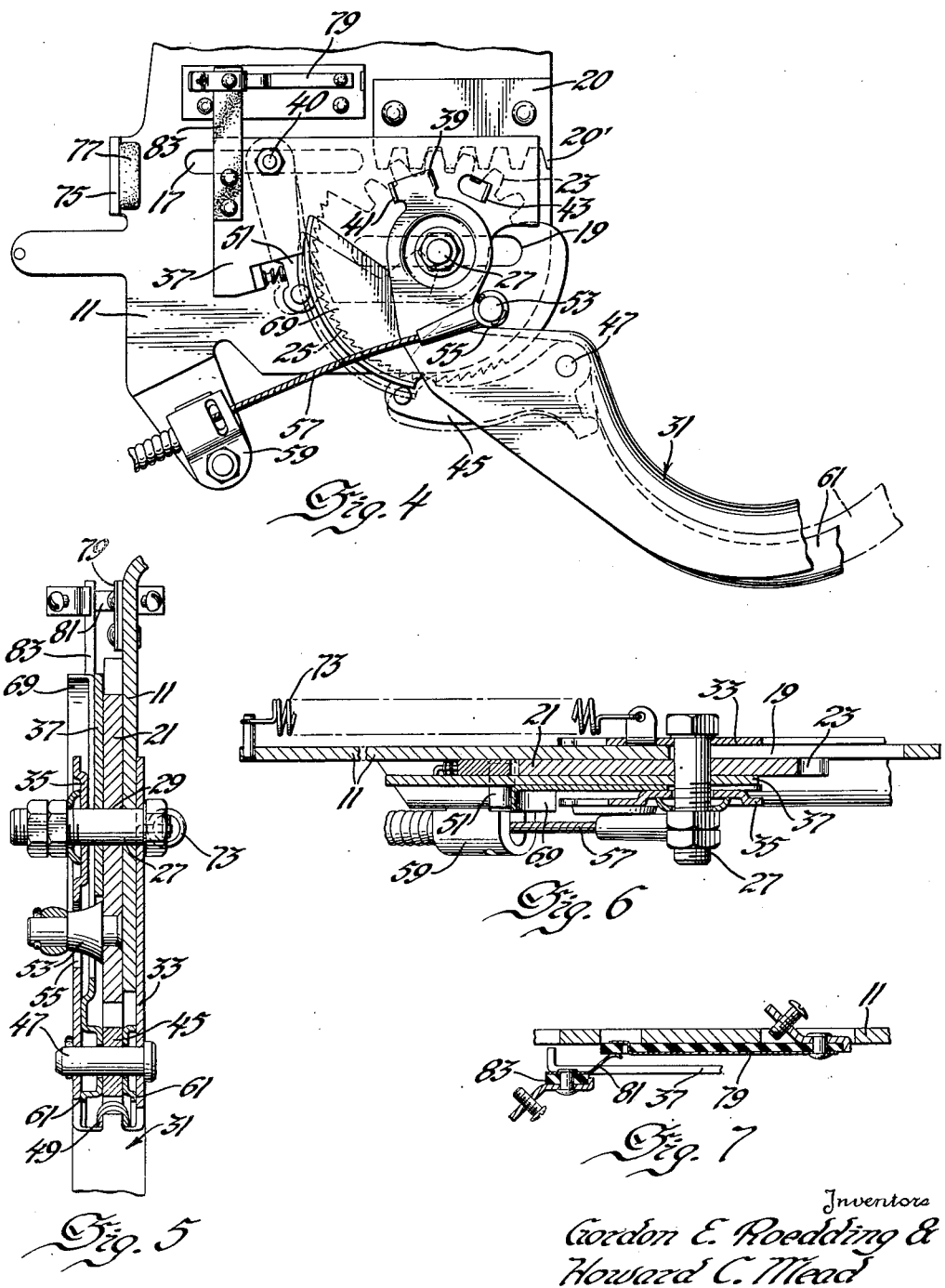

2,507,997

UNITED STATES PATENT OFFICE 2,507,997

PARKING BRAKE

Gordon E. Roedding and Howard C. Mead, Anderson, Ind., assignors to General Motors Corporation, Detroit, Mich., a corporation of Delaware Application May 25, 1946, Serial No. 672,303

13 Claims. (Cl. 74—517)

This invention is the result of efforts to improve the parking or emergency brake of a motor vehicle.

It has for its object the provision of means whereby the brake applying lever is movable through a plurality of stages or steps in each of which the lever moves between limiting stops. This avoids the swinging of the lever through an excessively long arc and the consequent sacrifice of the effective use of its lever arm. It also adds to the total lever movement which is particularly useful in applying brakes wherein the lining is worn thin.

Another characteristic of the novel mechanism is the provision for latching the brake in applied position by means independent of the lever, an arrangement which permits the lever to swing back out of the way of the operator after each stage of operation, thus avoiding interfering with the easy entrance and exit to and from the driver's seat.

A still further object is the provision of means which enables the operator by his movement of the lever to quickly take up clearances but which progressively increases the mechanical advantage so that the necessary forcible pressure is easily produced.

Other objects and advantages including the accomplishment of the above objects by simple and inexpensive structural parts will be understood from the description which follows.

On the accompanying drawings is illustrated what is believed to be the best of several designs which have been proposed as embodiments of the invention.

Fig. 1 is a view in side elevation showing positions of the hand lever at the start of and at the end of its movement for the first stage of its brake applying action.

Fig. 2 is a view in elevation partly broken away and in section.

Fig. 3 is a sectional view, the section line being marked on Fig. 1.

Fig. 4 is a view in elevation with the brake lever in the position relative to the other parts which it occupies at the end of each stage of its operation.

Fig. 5 is a section on line 5—5 of Fig. 2.

Fig. 6 is a section on line 6—6 of Fig. 2.

Fig. 7 is a section on line 7—7 of Fig. 2.

On the drawing, numeral 11 is used to identify a mounting plate. It will be secured to some convenient body part and be located preferably between the dash marked 13 and the panel 15, these being conventional on motor vehicles. The mounting plate 11 has two slots 17 and 19 for a purpose which will appear hereinafter. To it is secured a gear rack 20 with teeth 20'. At one side of plate 11 is a disc 21 having a series of gear teeth 23 at one part of its periphery and ratchet teeth 25 at another part. A bolt 27 passes through slot 19 in plate 11 and through a central hole 29 in disc 21.

The hand lever is marked 31. It is forked at its upper end, its side walls 33 and 35 being pivotally mounted on bolt 27. Fig. 5 shows that the part 33 is on the side of the mounting plate remote from the gear segment 21. Between the other part 35 and the gear segment is another and slidable plate 37. Bolt or pin 27 passes through one hole or aperture in plate 37. A bolt or pin 40 passes through another hole in plate 37 and through slot 17 of plate 11. This construction provides for a sliding of plate 37 relative to plate 11. Hand lever 31 beyond bolt 27 has an extended end forming an abutment 39 adapted to engage the one or the other of co-operating abutments 41 or 43 struck up from plate 37 into the path of movement of the lever abutment 39.

Hand lever 31 carries a pawl 45 pivoted thereto at 47 and adapted to engage ratchet teeth 25 under the influence of a spring 49 as shown on Fig. 2. A pawl 51 is pivoted on pivot pin 40, this being a holding pawl and also engaging the ratchet teeth 25.

Numeral 53 represents a pin carried by the gear end ratchet sector. The pin extends through an enlarged recess 55 in lever part 35 and through a registering opening in the trigger to be described below. To the pin is secured the end of a pull cable 57 which may pass through a guide 59 on the mounting plate 11 and extend to suitable brake applying means, not shown. There is a hand operated pawl release or trigger marked 61 assembled with lever 31 as shown by Fig. 3 with a rubber cushion 65. This trigger is pivoted at 47 heretofore referred to as the pivot for pawl 45. The trigger is normally held outwardly by a spring 67. Under the action of spring 67 the end of the trigger is made to engage pin 27 as a stop as shown in dotted lines in Fig. 4. The end of the trigger has an arcuate surface 69 adapted to engage and lift both pawls 51 and 45 from the ratchet teeth when the lower end at 71 is pressed into the main lever 31. A spring 73 attached to a pin on the fixed mounting plate 11 and to a tongue bent from arm 33 of the hand lever tends to swing the latter back after it has been rotated, as shown by full and dotted lines in Fig. 1.

By comparing Fig. 1 and Fig. 4, it will be seen that, in the operation of the mechanism, plate 37 slides along the mounting plate. To yieldingly check its return, the mounting plate is formed with a flange 75 and a cushioning bumper 77.

The relative movement of plates 11 and 37 may be employed to operate a signal to indicate that the parking brake is applied. To that end the mounting plate 11 has a fixed contact bar 79 and the movable plate 37 has a contact member 81 carried by an insulator 83 and adapted to slide along bar 79. Suitable electrical connections are made so that when plate 37 slides from its position, shown by Fig. 1, to the position shown by Fig. 4, parts 81 and 79 contact and a circuit including a warning light or bell is closed showing that the emergency brake is applied. Preferably the circuit will include the car ignition switch.

The operation will be readily understood. Fig. 1 shows the parts in the brake release position. The operator swings the hand lever through a limited arc and the abutment 39 engages abutment 41. In doing so pawl 45 rotates ratchet plate 21 and because of the geared connection of the ratchet plate with teeth 20' the ratchet plate is moved to the right as it rotates and carries plate 37 with it, the pivot 40 of pawl 51 moving in slot 17 and bolt 27 moving in slot 19. As the gear sector rotates and moves to the right it pulls the brake cable 57. The operator may then drop the lever. Its weight and spring 73 restore it to a position corresponding to its initial position wherein abutment 39 is stopped at 43. During this return lever movement pawl 51 holds the gear sector and pawl 45 rides freely over the teeth. A second application again pulls the cable in brake applying direction after which the lever again swings back out of the way of the operator. Additional steps of lever movement may be had if needed. It will be seen that if the brake shoe linings are badly worn and a considerable lever movement is required, it can be had by a few successive steps of operation. The total might exceed that which would be possible with a conventional lever. Then, too, as the lever handle travels through but a small arc during each step of the operation it remains advantageously positioned for the operator, the power arm remaining unchanged. The point of attachment of the cable, however, as it moves in a circle about bolt 27 which latter moves in the straight line determined by slot 19 has a decreasing lever arm so that the hand lever has an increased mechanical advantage for each stage of its operation.

When the brake is to be released, pressure on the trigger 61 pushes both pawls 45 and 51 and the parts return to their initial position, bumper 77 cushioning the return movement.

It will be observed that an angle of 90° is formed between the line joining the pivot of the holding pawl and its active tooth and the line from that tooth to the bearing for the gear. In consequence the holding pawl is released with a minimum of manual pressure on the trigger. In emergency brakes as commonly constructed considerable force must be applied to the lever for the reason that it is necessary to tighten the brake slightly prior to its release.

We claim:

1. In brake applying mechanism a fixed mounting plate, a slidable plate mounted to reciprocate relative thereto, a rack fixed to said mounting plate, a disc rotatable about a pin in said sliding plate and having teeth engaging said rack, a pull cable attached to said disc, a lever mounted on said pin, pawl and ratchet means between said lever and said disc, a second pawl pivoted to said sliding plate to engage and hold the disc when said pawl and ratchet means is released.

2. The invention defined by claim 1, said mounting plate having slots, said pin and said pawl pivot extending into said slots whereby the reciprocation of said sliding plate is guided.

3. The invention defined by claim 1, together with a trigger release on said lever operable to lift said holding pawl from the disc.

4. The invention defined by claim 1, contact members carried by said mounting plate and slidable plate, said members adapted to close an electrical circuit when the sliding plate is reciprocated from its brake release position.

5. The invention defined by claim 1, said lever having an abutment and said sliding plate having spaced stop lugs adapted to engage the opposed faces of the lever abutment whereby the movement of the lever is limited.

6. In a brake applying mechanism, a disc, a pin about which said disc may rotate, a pull member terminally attached to said disc, a rack, cooperating members on said disc and rack to effect linear movement of said pin and disc in response to disc rotation, a lever mounted on said pin, pawl and ratchet means on said lever and disc whereby said lever and disc may rotate together and pull said pull member, a holding pawl to retain said disc in brake-applied position while the lever swings in a reverse direction to a position from which it may rotate said disc a second time and whereby the power arm of the lever remains substantially unchanged while the work arm of the pull member progressively lessens, together with a slidable plate carrying said holding pawl, said slidable plate having an aperture for the passage of said pin whereby the plate is reciprocated jointly with the pin and disc and the holding pawl is retained in operative relation to the disc.

7. In brake applying mechanism, a fixed mounting plate, a disc, pivot means supporting the disc for pivotal and sliding movement relative to said mounting plate, means interconnecting said mounting plate and said disc to effect sliding movement when the disc is rotated, a brake pull member attached to said disc, a lever pivoted to said pivot means, a releasable connecting means between said lever and said disc, support means slidable with said pivot means, a second releasable connecting means between said sliding support and said disc.

8. In brake applying mechanism, a fixed mounting plate, a disc, pivot means rotatably supporting said disc, said pivot means being slidably mounted on said mounting plate, means interconnecting said mounting plate and said disc to effect sliding movement of the disc when the disc is rotated, a lever pivoted to said pivot means, a releasable connecting means between said lever and disc, a second releasable connecting means between said disc and mounting plate, a pull member attached to the side of said disc whereby the power arm of the lever remains substantially unchanged while the work arm of the pull member progressively lessens.

9. In brake applying mechanism, a fixed mounting plate, a disc, pivot means rotatably supporting said disc, said pivot means being slidably mounted on said mounting plate, means interconnecting said mounting plate and disc to effect sliding movement of the disc when the disc is rotated, a lever pivoted to said pivot means, means connecting said lever to said disc to rotate said disc when the lever is moved in one direction, a pull member attached to the side of said disc whereby the power arm of said lever remains substantially unchanged while the work of the pull member progressively lessens.

10. In a brake applying mechanism, a disc, a pin about which said disc may rotate, a pull member attached to the side of said disc, means cooperating with said disc to effect linear movement of said pin and disc in response to disc rotation, a lever pivotally mounted on said pin, releasable connecting means on said lever and disc whereby said lever and disc may rotate together and pull said pull member, and holding means to retain said disc in brake-applied position while the lever swings in a reverse direction to a position from which it may rotate said disc a second time and whereby the power arm of the lever remains substantially unchanged while the work arm of the pull member progressively lessens.

11. In brake applying mechanism, a fixed mounting plate, a disc pivoted to said plate, a lever pivoted to one end of said plate and having a handle at the other end coaxially with said disc, releasable connecting means mounted on said lever and disc for releasably engaging said lever and disc, a second releasable connecting means mounted on said plate and disc for releasably engaging said plate and disc, and elongated clutch release lever pivoted to said lever and extending substantially continuously with said lever and having a trigger adjacent said handle, a lateral extension fixed to the upper end of said release lever and contacting both of said clutch means.

12. In brake applying mechanism, a mounting plate having a stop bumper, pivot means slidably mounted on said plate, a lever pivoted on said pivot means, means interconnecting said lever and plate to move said pivot means in response to rotation of the lever, means to return the pivot and lever, and a lever mounted bumper on the pivot and lever assembly to engage said stop bumper.

13. In a brake applying mechanism, a mounting plate, lever means mounted for pivotal and sliding movement on said plate, means on the plate and lever means to move the lever longitudinally in response to lever rotation and releasable one way connecting means engaging said lever and slidably mounted on said plate.

GORDON E. ROEDDING.
HOWARD C. MEAD.

REFERENCES CITED

The following references are of record in the file of this patent:

UNITED STATES PATENTS

| Number | Name | Date |
|---|---|---|
| 617,722 | Devlin | Jan. 17, 1899 |
| 1,248,480 | Greenway | Dec. 4, 1917 |
| 2,287,037 | Jandus | June 23, 1942 |

FOREIGN PATENTS

| Number | Country | Date |
|---|---|---|
| 471,910 | Great Britain | Sept. 13, 1937 |

Certificate of Correction

Patent No. 2,507,997                                                  May 16, 1950

GORDON E. ROEDDING ET AL.

It is hereby certified that errors appear in the printed specification of the above numbered patent requiring correction as follows:

Column 2, line 34, for the word "end" read *and*; column 5, line 8, after "work" insert *arm*;

and that the said Letters Patent should be read with these corrections therein that the same may conform to the record of the case in the Patent Office.

Signed and sealed this 19th day of September, A. D. 1950.

[SEAL]

THOMAS F. MURPHY,
*Assistant Commissioner of Patents.*